Figure 3:
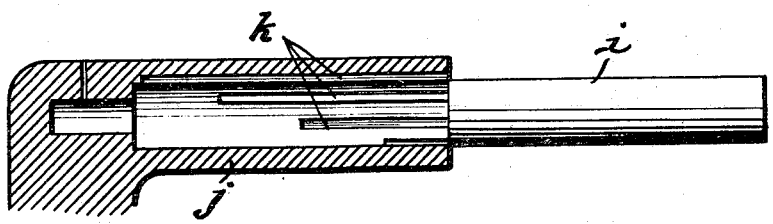

F. I. DU PONT.
APPARATUS FOR TESTING MINING POWDER.
APPLICATION FILED JULY 20, 1915.
1,161,462.
Patented Nov. 23, 1915.
2 SHEETS—SHEET 1.
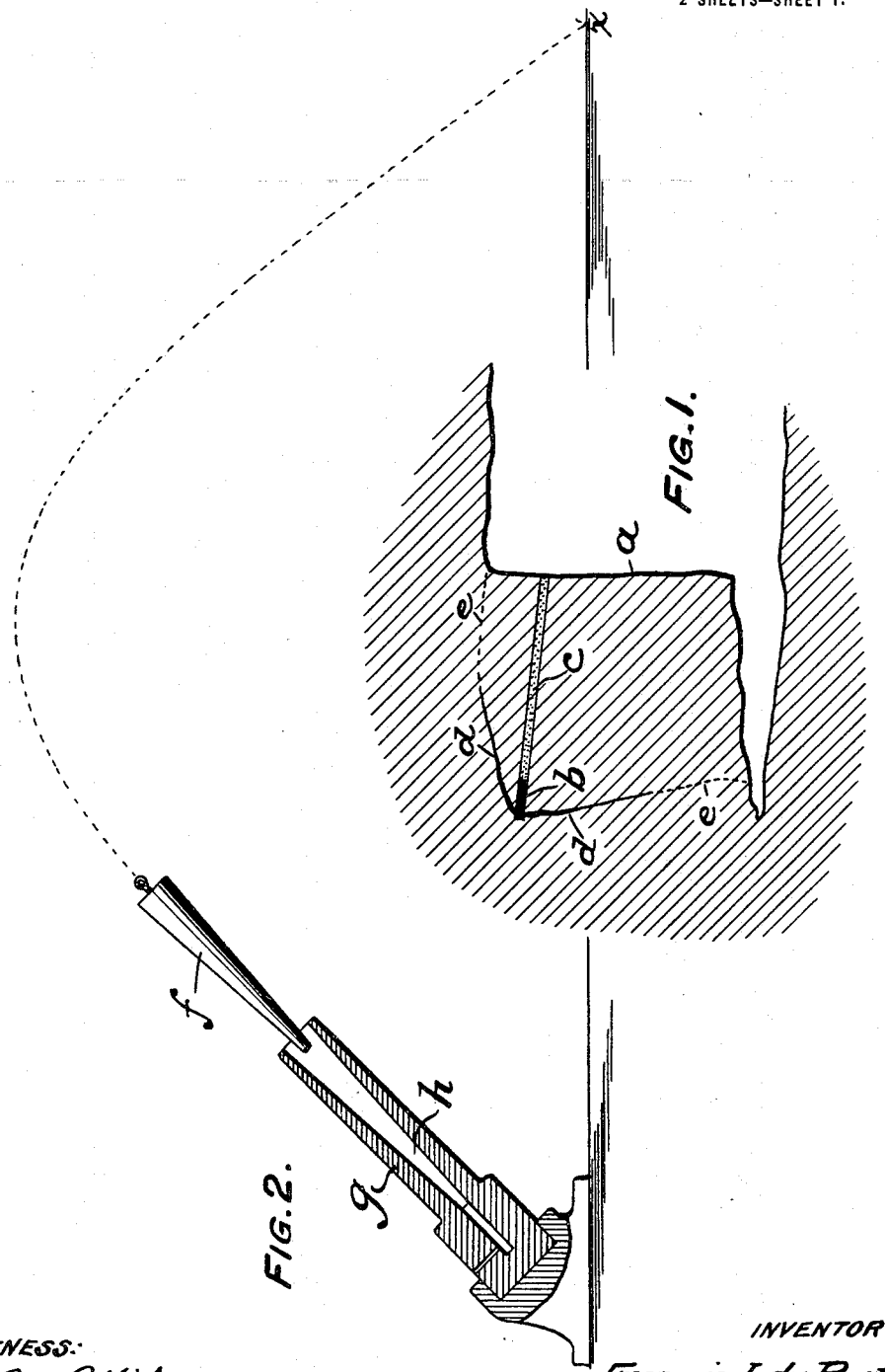
WITNESS:
Rob? R Kitchel
INVENTOR
Francis I. du Pont
BY
Frank S. Busser
ATTORNEY.

UNITED STATES PATENT OFFICE.

FRANCIS I. du PONT, OF WILMINGTON, DELAWARE, ASSIGNOR, BY DIRECT AND MESNE ASSIGNMENTS, TO BALL GRAIN EXPLOSIVES COMPANY, OF WILMINGTON, DELAWARE, A CORPORATION OF DELAWARE.

APPARATUS FOR TESTING MINING-POWDER.

1,161,462.   Specification of Letters Patent.   Patented Nov. 23, 1915.

Application filed July 20, 1915. Serial No. 40,938.

*To all whom it may concern:*

Be it known that I, FRANCIS I. du PONT, a citizen of the United States, residing at Wilmington, county of New Castle and State of Delaware, have invented a new and useful Improvement in Apparatus for Testing Mining-Powder, of which the following is a full, clear, and exact description, reference being had to the accompanying drawings, which form a part of this specification.

The object of my invention is to provide an apparatus for testing mining powder.

More specifically my object is to provide a gun in which the conditions that exist in coal when a blast is being made are simulated with sufficient accuracy to enable various kinds of powder to be compared and the quality of any particular powder to be evaluated.

To enable the principle of construction and mode of operation of the invention to be understood, the conditions produced by the explosion of a blast of powder in a body of coal should be understood. As is well known, a hole is bored in the body of coal of a length of about six feet. The charge of powder is placed at the base of the hole, which is then packed full of tamping. When the charge of powder is exploded, fissures are produced in the coal. The gases from the explosion escape in these fissures, and exert pressure upon the coal, throwing it down and heaving it out. As soon, however, as the fissure becomes large enough or communicates with the outside, the gas from the powder escapes and all excess powder which burns after these fissures are opened to the outside is useless, as the gas escapes without doing useful work. For this reason it becomes important to so regulate the composition, size of grain, density, etc. of the powder, that all of the work will be done before the fissures are opened too wide. To this end it becomes necessary to test the powder under conditions approximating those existing in actual use. I have discovered that these conditions may be approximated in a gun having the characteristics hereinafter pointed out.

The invention will be better understood by reference to the accompanying drawings, in which—

Figure 1 is a sectional diagram showing the average conditions produced during the blasting of, say, bituminous coal. Fig. 2 is a sectional view of the gun and a view of the projectile being discharged therefrom. Figs. 3 to 8 inclusive are longitudinal sectional views of modifications, with the exception of Fig. 6 which is a side view of a modified projectile.

In the body of coal $a$, shown in Fig. 1, is formed a hole in the bottom of which is placed a charge $b$ of mining powder, the hole being packed full of tamping $c$. The charge of powder is supposed to be in the act of exploding, $d$, $d$ representing fissures being formed, which will eventually break out and widen at the points $e$, $e$, thereby throwing down the mass of coal between the fissures and the exposed face of the coal body.

The gun $g$ shown in Fig. 2 is provided with a bore $h$ which form its mouth through the greater part of its length is conical, the remainder of the bore being cylindrical and of about the diameter used for a blast of coal. In the conical part of the bore neatly fits a conical projectile $f$. The gun is preferably mounted at an angle of about 45 degrees.

When the gun is fired, the projectile immediately begins to move forward, and as it does so, an annular opening appears around the projectile, which increases in area as the projectile moves forward. This, to a sufficient extent, simulates the opening of the fissures $e$, $e$, Fig. 1. The test is made by measuring the distance from the gun to the point $x$, where the projectile falls on the ground.

Figure 4:
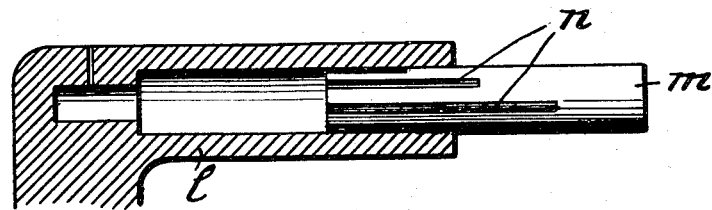
Figure 5:
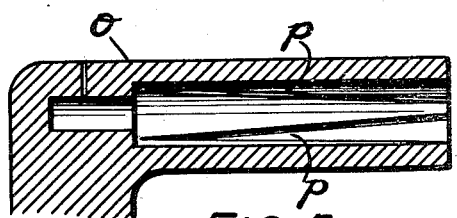
Figure 6:
Figure 7:
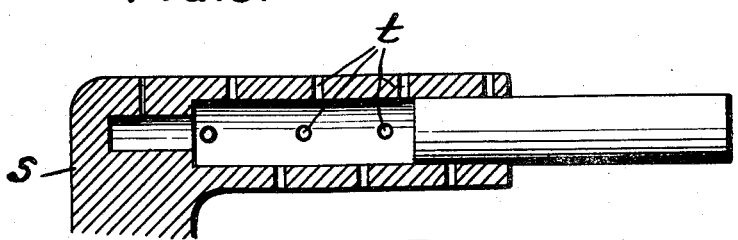
Figure 8:
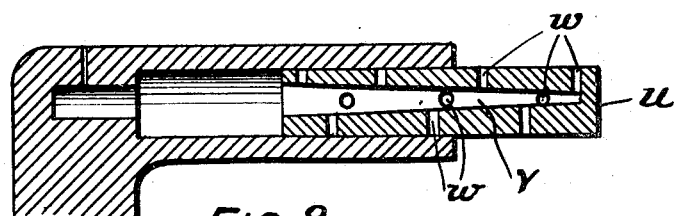

It will be understood that with the ordinary gun and projectile, substantially no area for the escape of gas exists until the projectile has actually left the muzzle. This area increases suddenly during the minute period that the projectile (if it be cylindrical) is traveling one-fourth of its diameter beyond the muzzle of the gun. After it has traveled this distance the area of escape is equal to the area of the gun itself. It will therefore be understood that the fundamental structural feature of the gun, in its broadest aspect, involves a gradual or progressive increase of area bearing a ratio to the distance of travel of the projectile substantially less than the ratio which obtains with the ordinary projectile, whether it be of spherical form or has its rear end cylindrical. Bearing this principle in mind, it will be understood that the modifications shown in Figs. 3-8 of the preferred embodiment of the invention disclosed in Fig. 2 exhibit the essential characteristics of the preferred embodiment. Thus in Fig. 3 the projectile $i$ is cylindrical. The bore of the gun $j$ is also cylindrical but is provided with longitudinal grooves $k$ of varying length, so that, in the discharge of the projectile, the area of escape for gases will progressively increase immediately after the projectile starts to move in its bore. The same result is accomplished by providing, as shown in Fig. 4, a cylindrical gun $l$ with a smooth bore and a projectile $m$ having longitudinal grooves $n$. In Fig. 5, the bore of the cylindrical gun $o$ has one or more grooves $p$ the cross-sectional area of which gradually increases toward the mouth of the gun. In Fig. 6 the cylindrical projectile $q$ has one or more grooves $r$ the cross-sectional area of which gradually increases toward the rear of the projectile. In Fig. 7, the wall of the gun $s$ is provided with perforations $t$, to accomplish the same result. In Fig. 8, the projectile $u$ has an axial channel $v$ from which extend radial perforations $w$.

The invention is applicable to test all kinds of mining powder except dynamite and permits them to be compared with sufficient accuracy to enable the quality of any given powder to be evaluated.

Having now fully described my invention, what I claim and desire to protect by Letters Patent is:

1. An apparatus for testing explosive powder, comprising a gun and projectile constructed to provide, during discharge of the projectile, a gradual increase in area of the opening for escape of gases having a ratio to the distance of travel of the projectile less than the ratio which obtains with guns having a solid cylindrical bore, and solid projectiles having a spherical contour or cylindrical rear ends.

2. An apparatus for testing explosive powder comprising a gun and a projectile and including means providing a progressively increasing area of escape for gases during the actual travel of the rear end of the projectile through the bore of the gun for a distance not less than a major part of the length of the projectile.

3. An apparatus for testing explosive powder comprising a gun and a projectile and including means providing a progressively increasing area of escape for gases during the actual travel of the rear end of the projectile through the major part of the length of the bore which it traverses.

4. An apparatus for testing explosive powder comprising a gun and an elongated projectile one of which is cut away from a solid cylindrical form to afford a progressively increasing area of escape for gases during the travel of the rear end of the projectile through the major part of the length of the bore which it traverses.

5. An apparatus for testing explosive powder, comprising a gun having a bore whose cross-sectional area from its inner portion progressively increases toward its mouth, and a projectile adapted to the bore.

6. An apparatus for testing explosive powder, comprising a gun having a conical bore and a conical projectile adapted to fit the bore.

7. An apparatus for testing explosive powder, comprising a gun having a bore which for the greater part of its length is conical and which at its inner end is cylindrical, and a projectile adapted to fit the conical part of the bore.

In testimony of which invention, I have hereunto set my hand, at Philadelphia, on this 15th day of July, 1915.

FRANCIS I. du PONT.